2 Sheets—Sheet 1.
M. W. KNOX.
Potato Digger.
No. 101,474. Patented April 5, 1870.
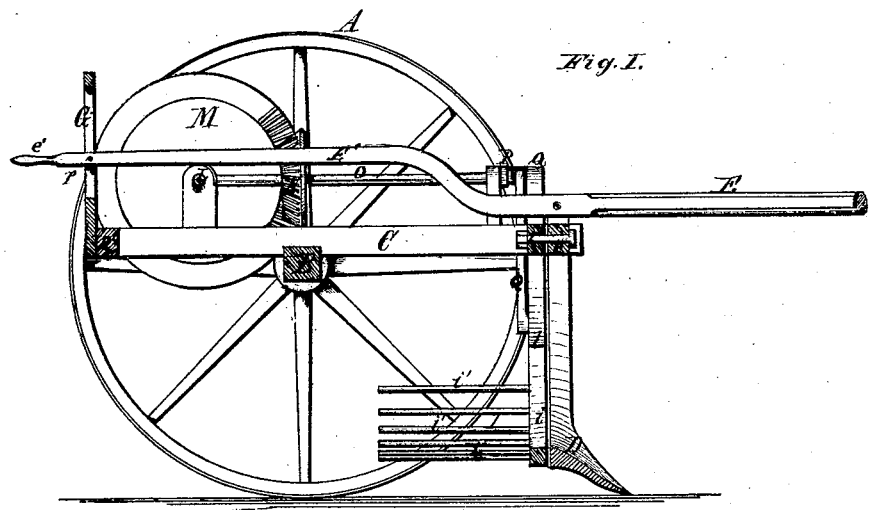
Fig. I.
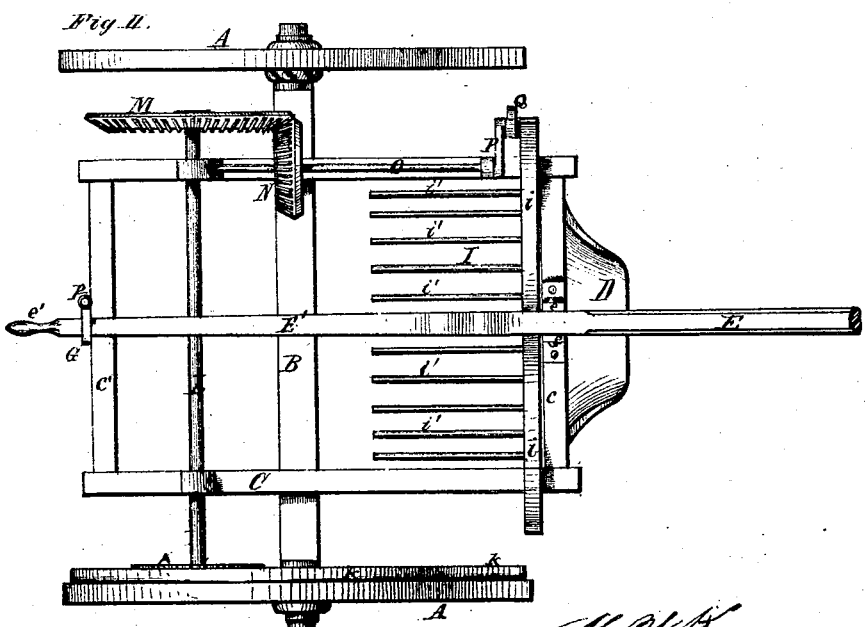
Fig. II.
Witnesses.
M. W. Knox, Inventor

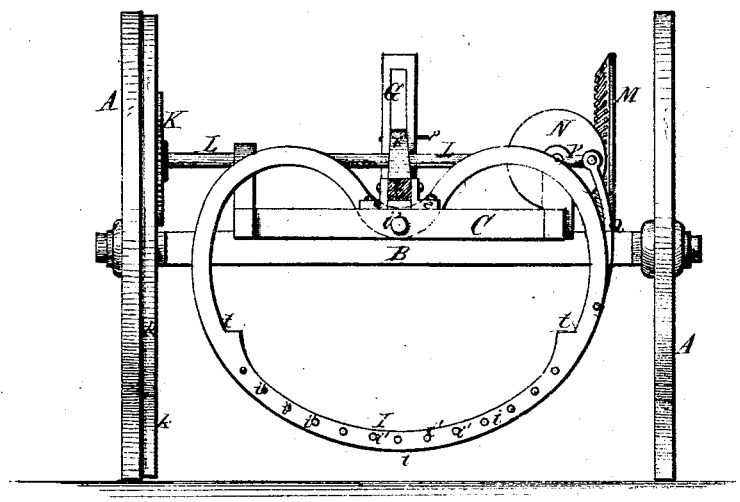

UNITED STATES PATENT OFFICE.

MELVIN W. KNOX, OF SHERIDAN, NEW YORK.

IMPROVEMENT IN POTATO-DIGGERS.

Specification forming part of Letters Patent No. 101,474, dated April 5, 1870.

*To all whom it may concern:*

Be it known that I, MELVIN W. KNOX, of Sheridan, in the county of Chautauqua and State of New York, have invented certain new and useful Improvements in Potato-Diggers, of which the following is a specification.

My improvements relate to that class of wheel-machines which are furnished with a plow or scoop for the purpose of digging, and a sifter or grate arranged therewith for the purpose of separating the potatoes from the earth.

My invention consists, first, in extending the tongue of the machine backward from the point where it is hinged to the frame, so as to form a lever, which, being moved vertically by the driver, raises or lowers the forward end of the frame, the end of the lever being secured in place in a guide-standard, or by equivalent means; second, in arranging and securing the plow and oscillating riddler to the front of the frame of the machine, so as to be raised and lowered by the combined tongue and lever above referred to; third, in providing the frame of said riddler with projections or teeth for preventing the clogging of the vines between the plow and the riddler.

In the accompanying drawings, Figure I is a sectional elevation of my improved machine; Fig. II, a plan; Fig. III, a front elevation thereof with the plow removed.

Like letters designate like parts in each of the figures.

A A are the wheels.

B is the axle.

C is a rectangular frame.

D is the plow or scoop, secured to the frame underneath the forward end thereof.

E is a tongue pivoted in a bracket, $e$, attached to the forward cross-beam, $c$, of the frame. It is constructed with an arm or lever, E', extending backward and terminating in a handle, $e'$, near the driver's seat F.

G is a slotted guide-standard fastened to the rear cross-beam, $c'$, of the frame, in which the extension E' of the tongue plays vertically and is retained against lateral movement. This tongue with its extension forms a lever having its fulcrum at the forward end of the former, while the power is applied at the rear end, $e'$, of the extension. It is evident that upon raising or lowering the handle $e'$ the front end of the frame and the plow attached thereto will be raised or lowered proportionally. The amount of vertical play of the handle may be regulated by stop-pins $p$ or other suitable means. By means of this arrangement the driver is enabled to raise the plow above the ground, when required, in traveling to and from the field and in turning around, and to regulate with facility the depth at which the plow runs to the depth of the potatoes in the ground.

I is a riddler or oscillating sifter consisting of a heart-shaped frame, $i$, and parallel bars or wires $i'$, projecting backward from the lower portion thereof. It is arranged behind and in close proximity of the plow D, and is pivoted at $i^2$ to the forward cross-beam, $c$, of the frame. The lower portion of the plow or scoop D, as well as that of the frame $i$, is curved after an arc constructed from the pivot-pin $i^2$ as a center, so that the lower portion of the frame $i$, when actuated as hereinafter described, will oscillate in an arc corresponding to the curve of the scoop.

K is a pinion meshing with a gear-rim, $k$, attached to the wheel A, and mounted on one end of a counter-shaft, L, supported in appropriate journals on the rear part of the frame C. A bevel-wheel, M, mounted on the other end of said shaft, drives a bevel-wheel, N, attached to a shaft, O, arranged at right angles to the former, the latter carrying a crank, P, at its end near the riddler I. A rod, Q, connects the crank with the frame $i$, and imparts a swinging or oscillating motion to the same.

When the machine is working, the potatoes and earth are elevated by the plow or scoop and fed onto the sifting-bars, the oscillating movement of which separates the potatoes from the earth most effectually, and deposits the former near the center line of the machine along the ground, which allows of gathering the same with great ease and facility, thereby remedying a long-felt defect in machines of this kind which scatter the potatoes all over the ground.

Instead of the above-described mechanism for actuating the riddler, any other suitable device may be employed. For instance, the machine may be constructed with its wheels tight on the axle, and the riddler operated by mechanism connecting with gearing on the axle.

The riddler-frame $i$ is provided on its inner curved surface with two or more projections or teeth, *t t*, as clearly shown in Fig. III. They are so located in the frame *i* as to have a nearly vertical reciprocating movement, which raises and loosens the vines and prevents them clogging between the plow-frame and the riddler, and enables them to pass onto the sifting-bars of the latter, whence they are discharged, which is essential to the satisfactory working of the machine.

The objects and advantages of my improvements are manifest from the foregoing description.

What I claim as my invention is—

1. The combined tongue and lever E E', pivoted to and arranged with the frame C, for raising and lowering the forward end thereof, substantially as hereinbefore set forth.

2. The arrangement of the plow and oscillating riddler D I, when secured to the front end of the frame C, and raised and lowered by the combined tongue and lever E E', substantially as hereinbefore set forth.

3. The projections *t t* of the frame *i*, arranged and operating with the plow D, as and for the purpose hereinbefore specified.

MELVIN W. KNOX.

Witnesses:
A. W. POPPLE,
E. C. WILLIAMS.